United States Patent
Kuo

[11] Patent Number: 5,704,526
[45] Date of Patent: Jan. 6, 1998

[54] FIXTURE FOR A PADLOCK

[76] Inventor: Li-Tsao Kuo, No. 47-8, Alley 36, Lane 459, Sec. 1, An Ho Rd., Tainan, Taiwan

[21] Appl. No.: 727,218

[22] Filed: Oct. 8, 1996

[51] Int. Cl.[6] .................................................. E05B 71/00
[52] U.S. Cl. .................... 224/425; 224/935; 248/229.17; 403/322
[58] Field of Search .......................... 224/425, 935; 248/229.17, 229.1, 229.11, 230.1; 403/322, 321, 378

[56] References Cited

U.S. PATENT DOCUMENTS

| | | | |
|---|---|---|---|
| 4,736,921 | 4/1988 | Zane et al. | 224/935 |
| 5,405,113 | 4/1995 | Jaw | 224/425 X |

*Primary Examiner*—Renee S. Luebke
*Attorney, Agent, or Firm*—Morton J. Rosenberg; David L Klein; Jun Y. Lee

[57] ABSTRACT

A fixture for a padlock is provided in which a hold-down support is formed by a staying bracket and a cylindrical holder. A couple of opposing lugs are formed on the respective edges of an opening formed through the wall of the holder, and two locating holes are formed through the side wall of the holder, the holes being an a 90° angle therebetween. Each lug has a convex projection formed on the inner surface thereof. A trigger piece is inserted into the space between the two curved projections of the two lugs and is pivoted on a locating pin. The trigger piece has two cams formed on opposing sides thereof that contact the peaks of the convex projections of the lugs when the trigger piece is rotated. By rotating the trigger piece, the opening is adjustable so as to hold or free the cylindrical lock body of the padlock. The padlock's lock bar can pass through a selected one of the locating holes and lock into the cylindrical lock body.

2 Claims, 8 Drawing Sheets

FIXTURE FOR A PADLOCK

BACKGROUND OF THE INVENTION

1. Field of the Invention

The present invention relates to a fixture for a padlock. More particularly, the present invention is directed to a universal bracket that can secure a padlock in a selected direction, in a stable and secure manner.

2. Prior Art

Figure 7:
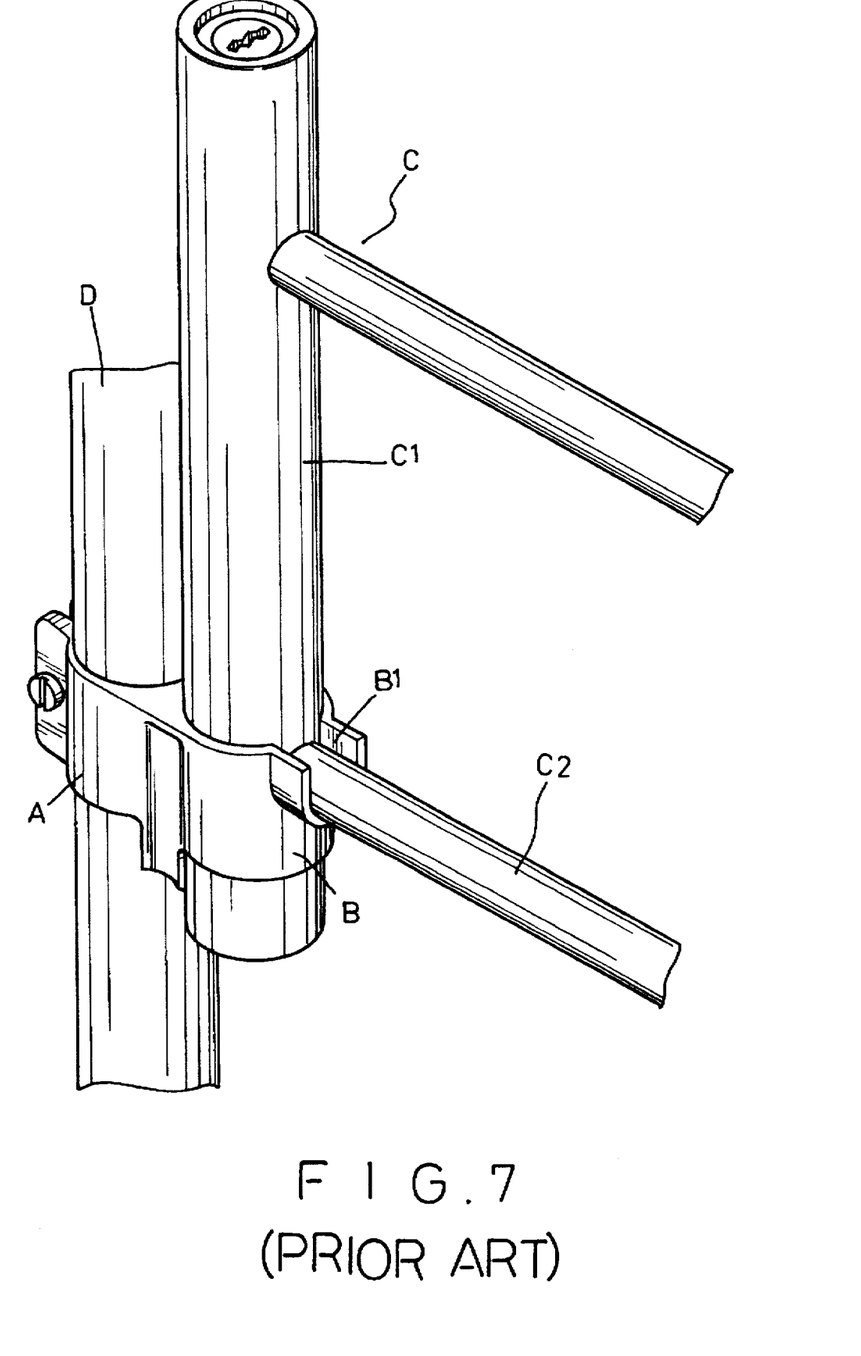
FIG. 7 is a perspective view showing a first conventional padlock in mounting state, only partially displayed.

Referring to FIG. 7, a conventional padlock fixture includes a staying bracket A at one side, and an endless circular holder B with a U-shaped open slot B1 at the other end. By fastening the staying bracket A on a bicycle frame D, the conventional support is attached on the bicycle and is prepared to accept a U-shaped padlock C to be locked therein. One end of the cylindrical lock body C1 passes through the circular holder B and the lock rod C2 hangs over the open slot B1 for clamping the lock bar in the U-shaped open slot B1 to prevent it from swiveling and swinging. But due to the open state of said U-shaped open slot B1, after a long time of use, there will be a gap formed between the lock bar and the U-shaped open slot B1, and between the cylindrical lock body C1 and the circular holder B, respectively. Therefore, the padlock can be shot out from the circular holder B by a concussion. In addition, the padlock placed in the holder B can be taken away so easily, that it is often lost.

Figure 8:
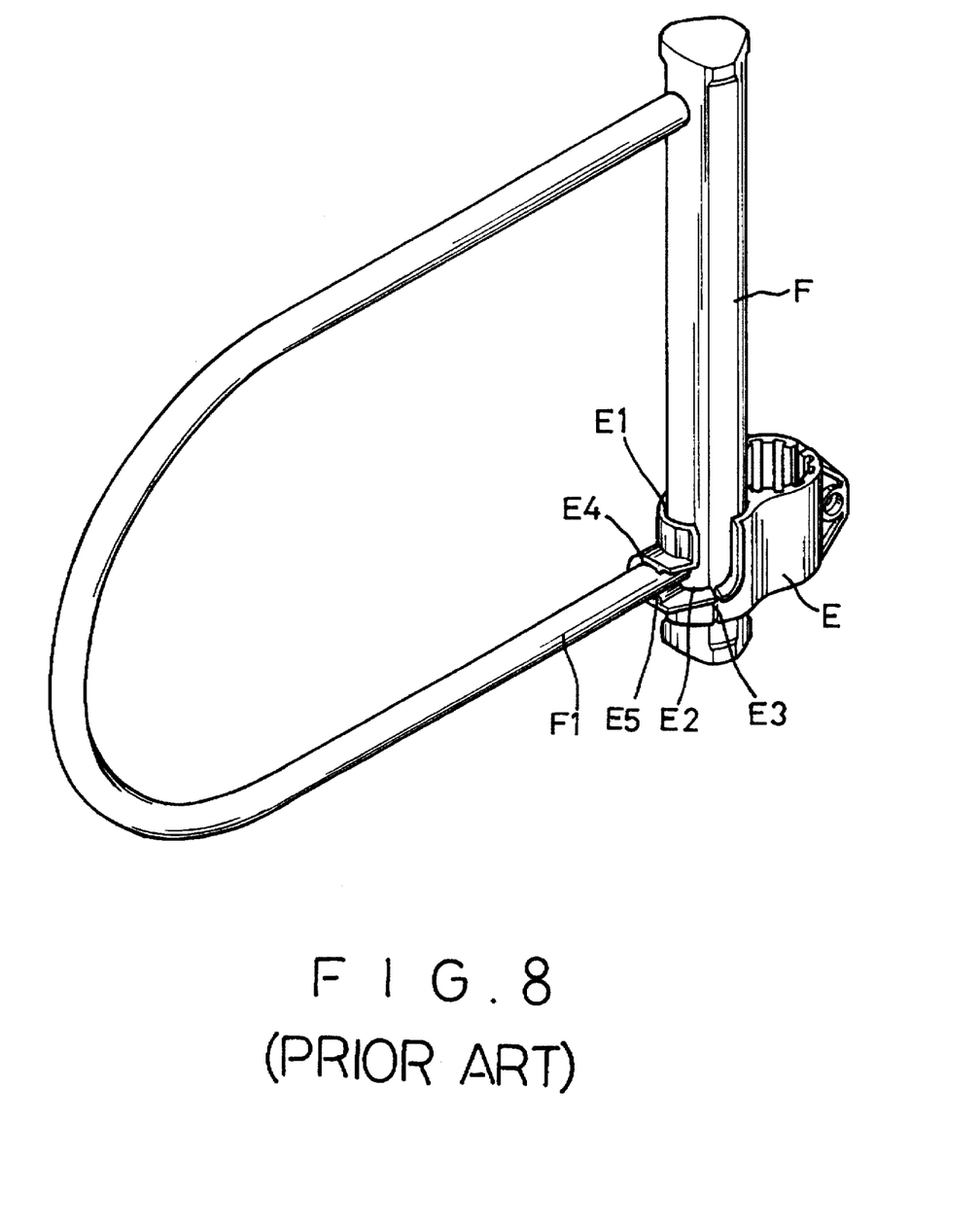
FIG. 8 is a perspective view of a second embodiment of a conventional lock.

A second conventional padlock fixture E, as shown in FIG. 8, has the same contour as the first embodiment, with the exception that the circular holder E1 comprises a boss E4 laterally offset with respect to the holder E1 and having a bore E2 through boss E4. The bore E2 has a projection E5 adapted to confine the U-shaped lock rod F1 from moving randomly within the bore E2. An opening E3 is formed next to the bore E2 so that the cylindrical lock body F can be inserted into the holder E1 and the lower body of the lock rod F1 can be pushed into the bore E2, passing through the projection E5, to hold the cylindrical lock body F therein. However, this type of lock cannot hold the lock tightly when a bumpy road is experienced, and may detach from the fixture E.

Figure 9:
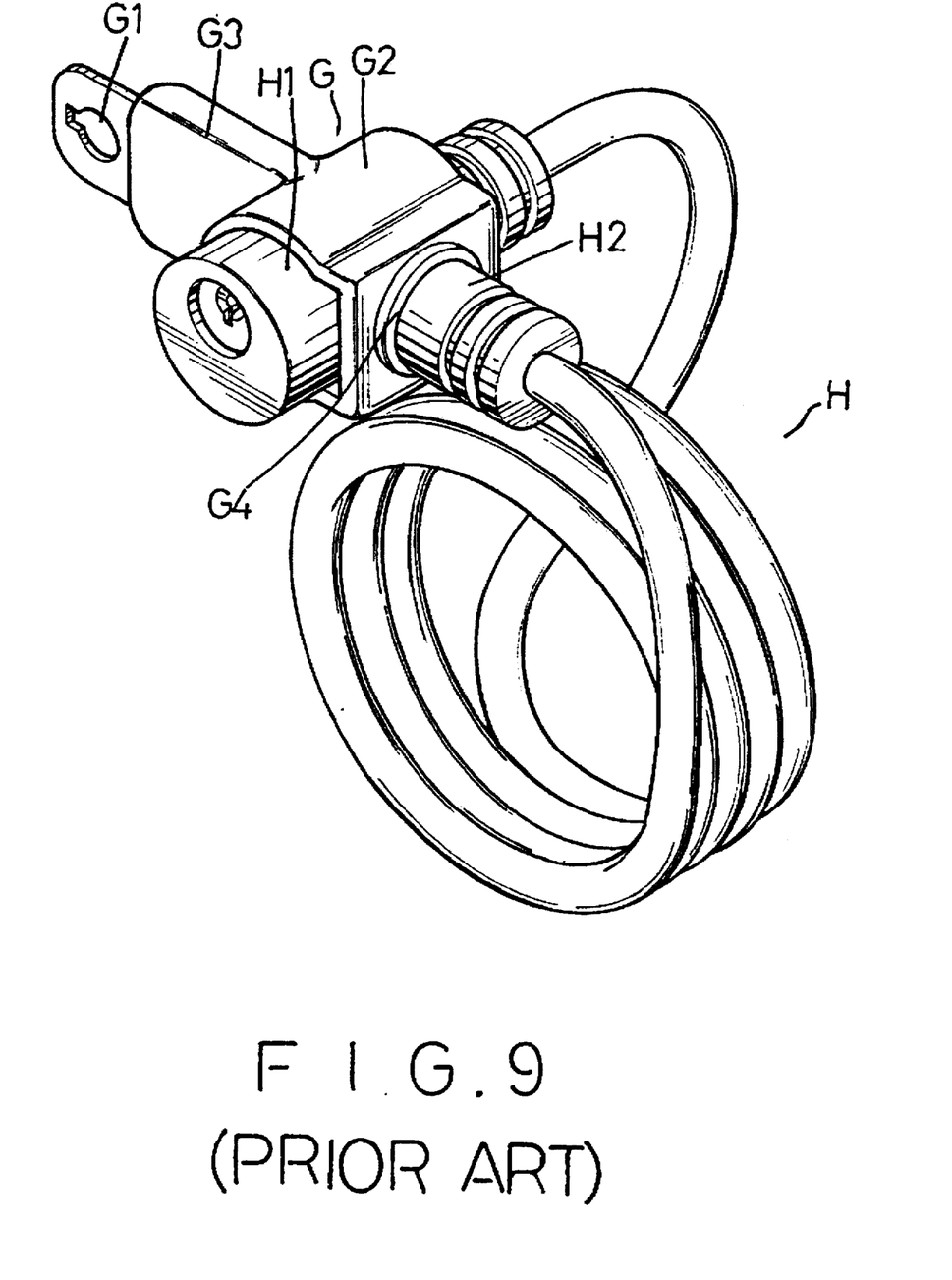
FIG. 9 is a perspective view of a third embodiment of a conventional lock.

Another lock fixture, as shown in FIG. 9, is also well known. This fixture is mainly used for a cable lock and includes a housing G having an arm G3 integrally formed and extending from one side, a lug G1 integrally formed and extending from the opposite side of the arm G3, and a bore G4 formed on the body of the housing G. The housing G houses a lock core therein and one end H1 of a cable H being secured to the lock core. The other end H2 of the cable H is inserted into the bore G4 and secured in the lock core. This type of lock takes less space to store, but the cable end H2 may be dislodged easily by force.

SUMMARY OF THE INVENTION

It is a main object of the present invention to provide a fixture for a padlock that can locate the padlock in a desired direction to meet various requirements.

DETAILED DESCRIPTION OF THE PREFERRED EMBODIMENTS

Figure 1:
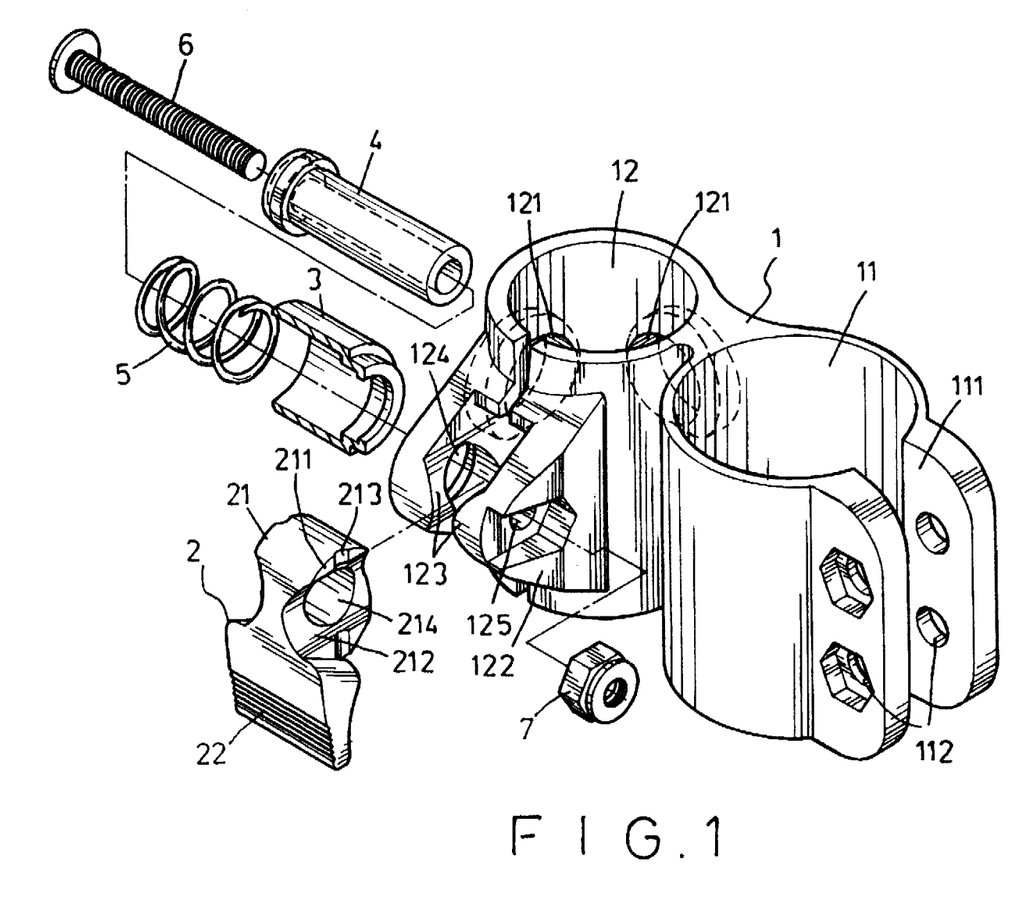
FIG. 1 is an exploded perspective view of the present invention.
Figure 2:
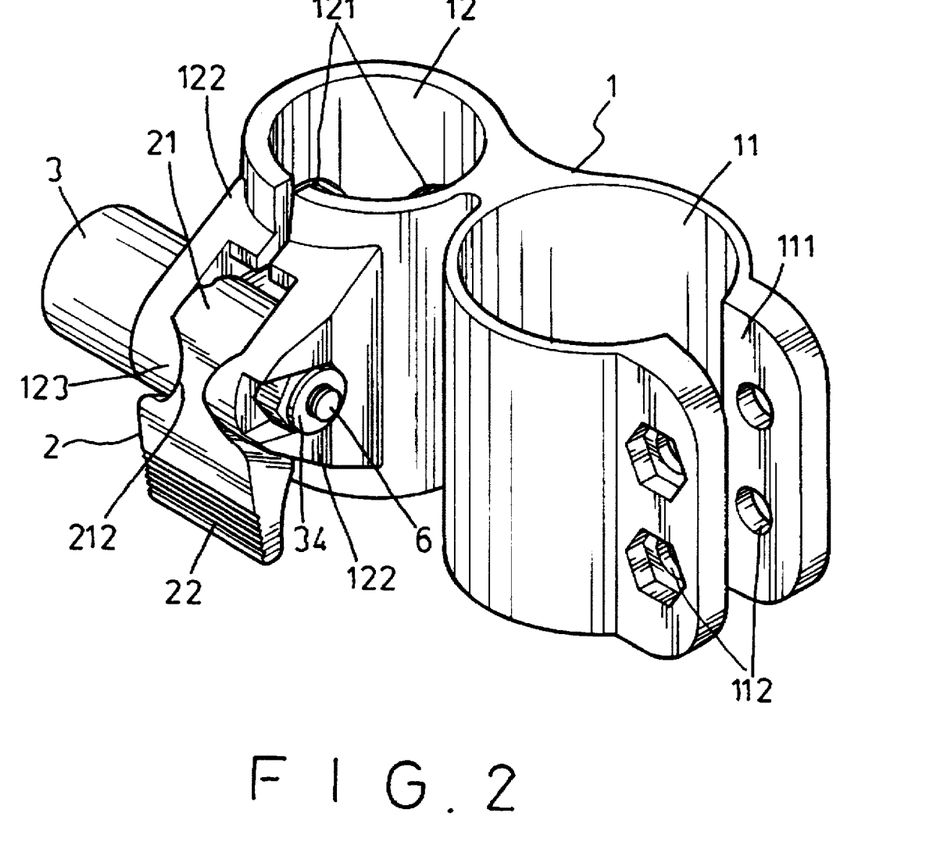
FIG. 2 is a perspective view of the present invention.

Referring to FIG. 1 and FIG. 2, the present invention comprises a hold-down support 1, a trigger piece 2, a pin bush 3, a locating pin 4, a spring 5, a bolt 6 and a nut 7. The hold-down support 1 is integrally formed with a staying bracket 11 on one side and a cylindrical holder 12 on the other side and connected to the staying bracket 11. An opening is formed in the wall of bracket 11 and the holder 12, respectively.

The staying bracket 11 has a couple of clips 111 formed on the respective edges of the opening formed therein, and two fixing holes 112 formed in each clip 111 and penetrating therethrough. The holder 12 has two locating holes 121 formed through the side wall at an angle of 90° with respect to each other. The holder 12 has a couple of lugs 122 extending from opposing edges of the opening formed in the holder 12. The pair of lugs 122 each have a convex projection 123 extending from a respective inner surface of the pair of lugs 122. One of the lugs 122 has a through hole 124 formed therein and the other has a smaller through hole 125 formed therein.

The trigger piece 2 has a pivotal sleeve 21 with a pair of wave-shaped cams at respective opposing upper sides thereof. The trigger piece 2 has a switch head 22 formed on the bottom end of the pivotal sleeve. Two wave crests 211 are formed on each of the opposing sides of the pivotal sleeve 21 and a wave trough 212 is formed between each pair of crests 211. A fillister 213 is formed in the peaks of each of the wave crests 211. A pin hole extends through the pivotal sleeve 21.

The pin bush 3 is a hollow sleeve having different inner diameters at respective ends thereof. A spring 5 is inserted in the pin bush 3, from the bigger diameter end, and the locating pin 4 passes through the spring 5 and forms a pivot between the lugs 122 of said holder 12.

Figure 3:
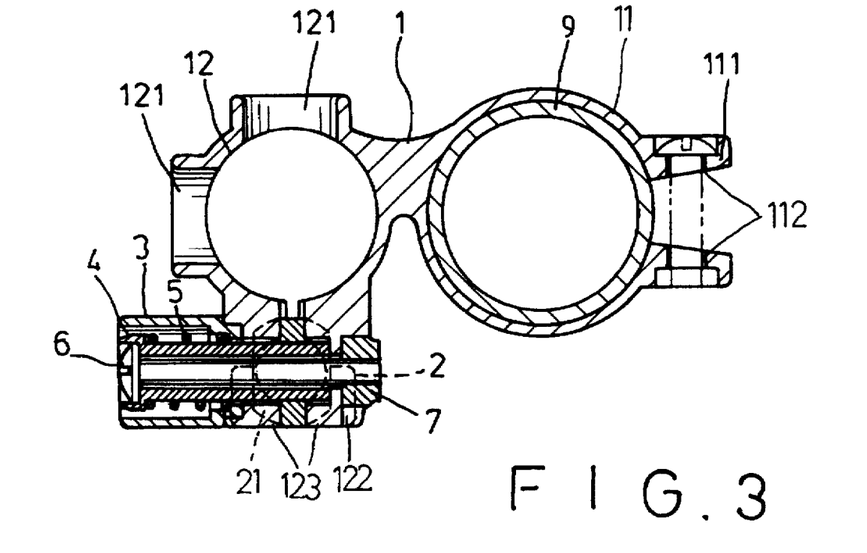
FIG. 3 is a cross-section view showing a locking state of the present invention.

In assembling the hold-down support, as shown in FIG. 2, the pivot sleeve 21 of the trigger piece 2 is meshed with the convex projections 123 of the lugs 122. The locating pin 4 is passed through the spring 5, the pin bush 3, the hole 124 of one lug 122, the pin hole 214 and into a recess formed around the hole 125 of the other lug 122, in sequence. The locating pin 4 is secured to the lugs 122 with a bolt 6 and a nut 7, so that the trigger piece 2 is able to pivot on the locating pin 4. The spring 5 urges the two lugs 122 to close the opening, as shown in FIG. 3.

Figure 4:
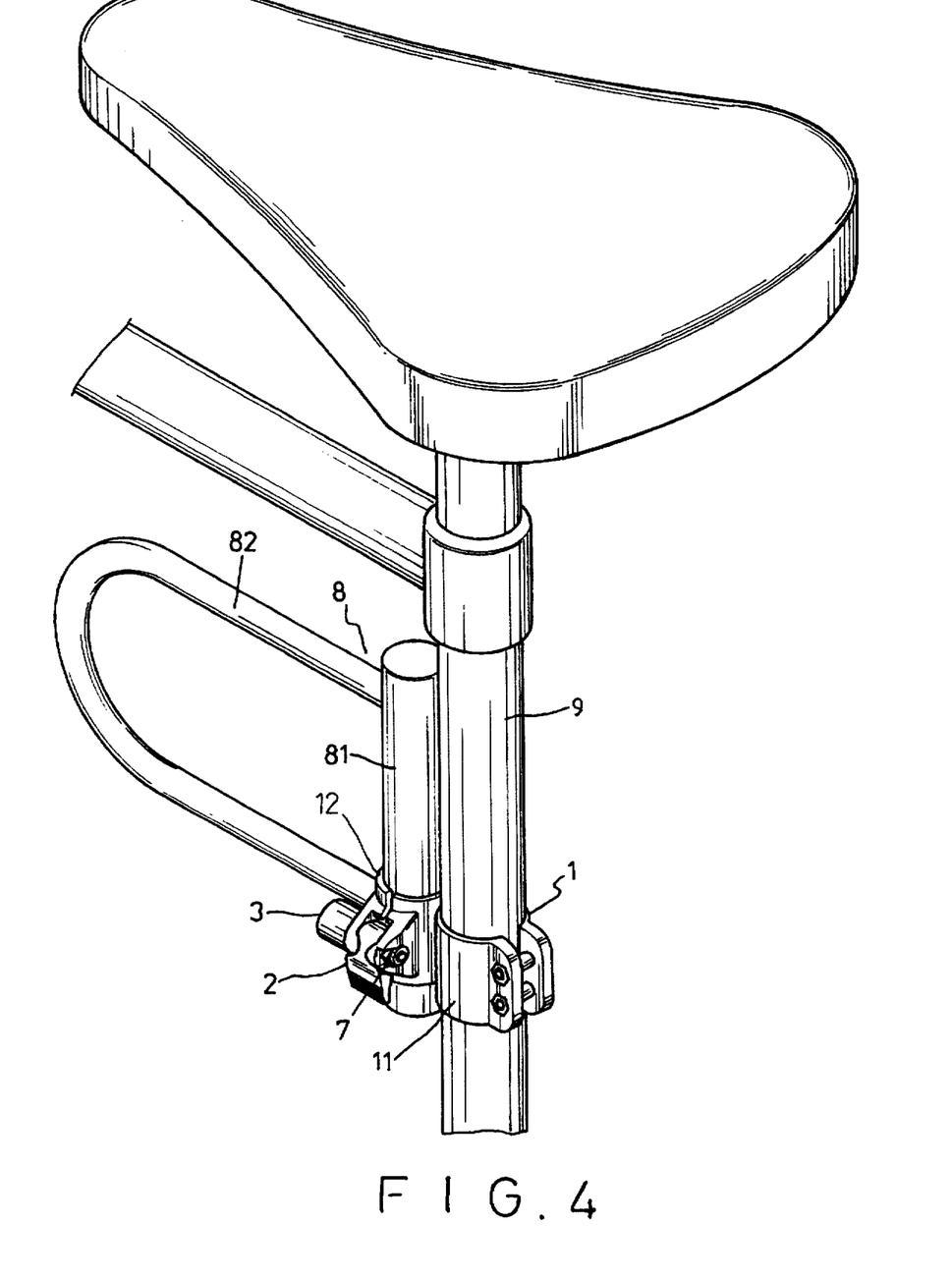
FIG. 4 is a perspective view showing a mounting state of the present invention.
Figure 5:
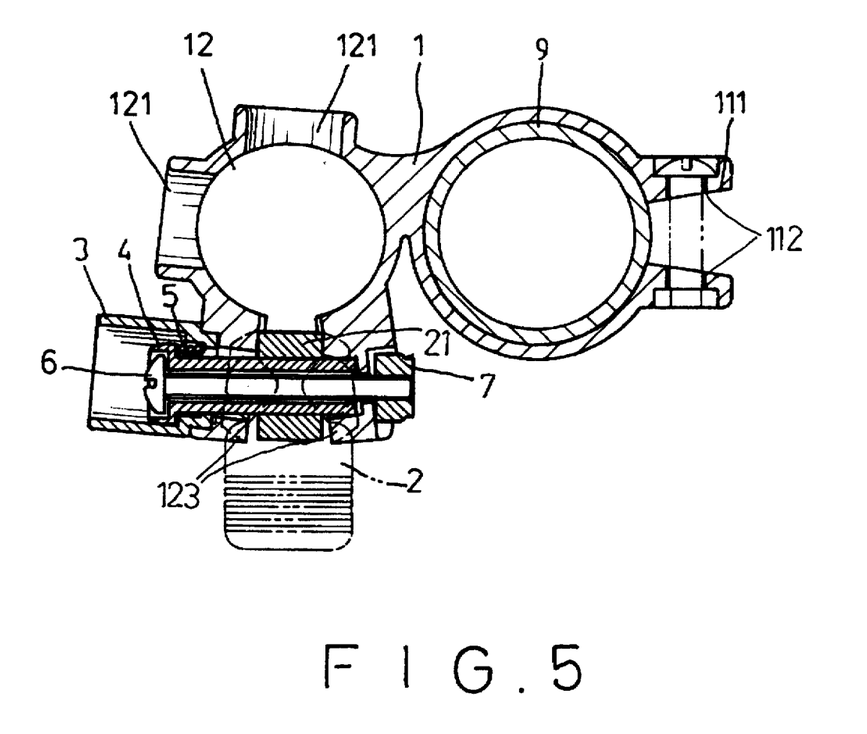
FIG. 5 is a cross-section view showing an unlocking state of the present invention.
Figure 6:
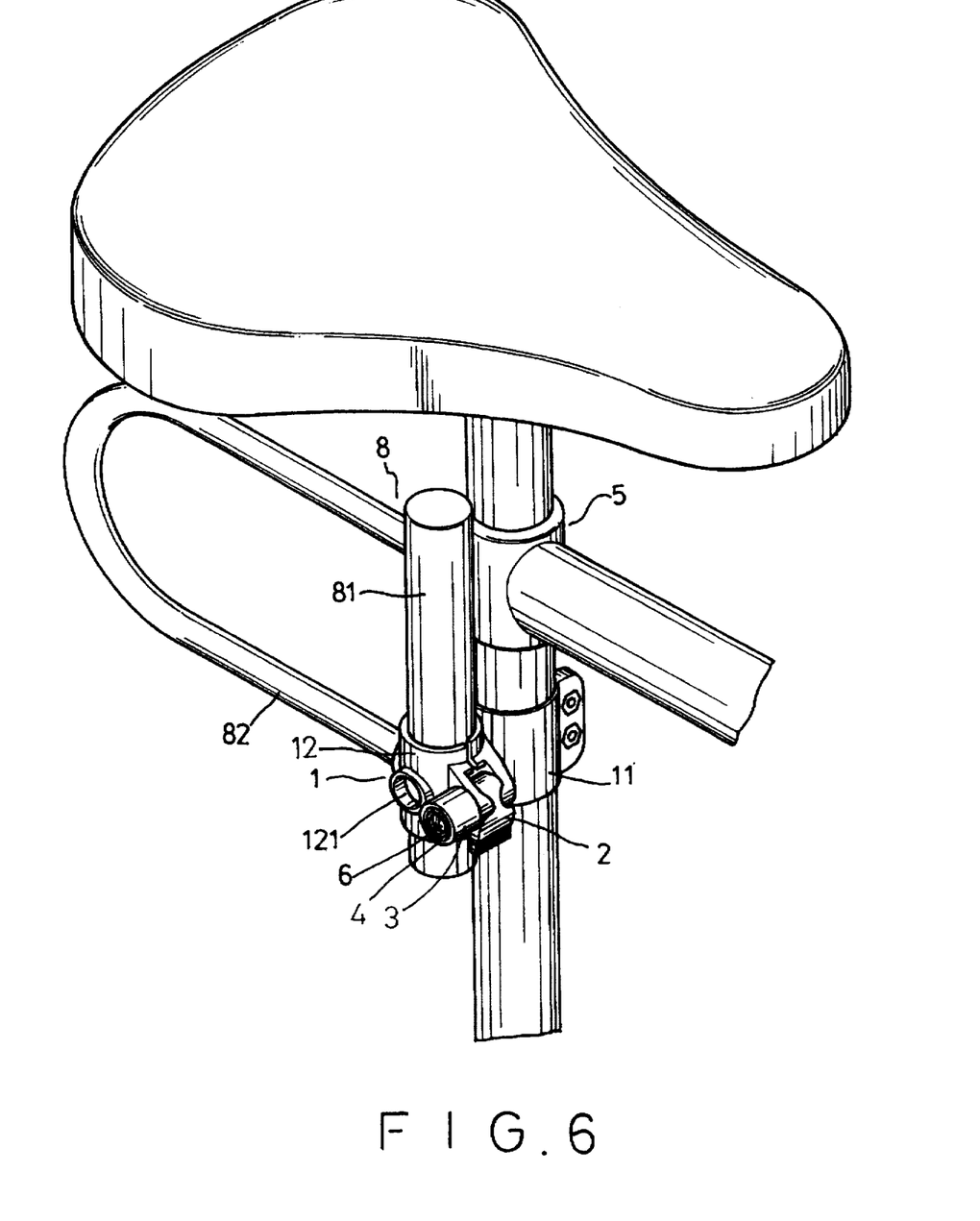
FIG. 6 is a perspective view showing another locking state of the present invention.

Referring to FIG. 4, the hold-down support i is attached to the bicycle frame by fastening the staying bracket 11 on the seat strut of a bicycle frame, as an example. By pulling up the switch head 22 of the trigger piece 2, the wave crests 211 press against the convex projections 123 of lugs 122, which urges open the opening of the holder 12. Then, the cylindrical lock body 81 of the padlock 8 is inserted into the holder 12, so that one end of the lock bar 82 is inserted into one of the locating holes 121 of the holder 12 and is locked in the cylindrical lock body 81. The switch head 22 of the trigger piece 2 is then pushed downward to restore the original state of the holder 12, urged by the spring 5, to hold the padlock securely. In addition, the padlock 8 can be fastened in various directions, as shown in FIG. 6, in order to accommodated a female riding the bicycle, depending on which locating hole 121 is chosen for receiving the lock bar 82 therein.

I claim:

1. A fixture for a padlock comprising:

a hold-down support adapted for coupling to a bicycle frame, said hold-down support including a staying bracket for coupling to the bicycle frame and a cylindrical holder for supporting a cylindrical lock body of a padlock therein, said holder having an opening formed through a wall thereof and a pair of lugs extending from said holder wall on opposing sides of said opening, each of said pair of lugs having a convex projection extending toward the other of said pair of lugs and a through hole formed therein;

a trigger piece having a pivotal sleeve pivotally coupled between said pair of lugs and a switch head extending therefrom, said pivotal sleeve having a through bore formed therein and a pair of wave-shaped cams respectively formed on opposing sides thereof, each of said wave shaped cams having a wave trough disposed between a pair of wave crests, each of said wave crests having a fillister formed in peak portions thereof, said opening being enlarged responsive to a rotation on said trigger piece to contact said convex projections of said pair of lugs with said wave crests for receiving the cylindrical lock body in said holder, the cylindrical lock body being secured in said holder responsive to a rotation on said trigger piece to contact said convex projections of said pair of lugs with said wave troughs;

a pivot assembly secured between said pair of lugs for pivotally coupling said trigger piece thereto, said pivot assembly including (1) a pin bush disposed adjacent one of said pair of lugs, (2) a spring disposed in said pin bush, (3) a locating pin extending through said spring, said pin bush, said through bore of said trigger piece, and said through hole of said one lug, (4) a bolt extending through said locating pin and said through hole of the other of said pair of lugs, and (5) a nut threadedly engage with said bolt.

2. The fixture for a padlock as recited in claim 1 where said wall of said holder has a pair of locating holes formed therethrough for receiving a lock bar of the padlock through a select one of said pair of locating holes, said pair of locating holes being disposed at a 90° angle each with respect to the other.

* * * * *